(12) United States Patent
Pause (10) Patent No.: US 7,320,357 B2
(45) Date of Patent: Jan. 22, 2008

(54) THERMAL CONTROL OF AUTOMOTIVE INTERIORS WITH PHASE CHANGE MATERIAL

(76) Inventor: Barbara Hildegard Pause, 7161 Christopher Ct., Longmont, CO (US) 80503

( * ) Notice: Subject to any disclaimer, the term of this patent is extended or adjusted under 35 U.S.C. 154(b) by 245 days.

(21) Appl. No.: 10/474,854

(22) PCT Filed: Apr. 13, 2002

(86) PCT No.: PCT/US02/11580

§ 371 (c)(1),
(2), (4) Date: Oct. 7, 2003

(87) PCT Pub. No.: WO02/083440

PCT Pub. Date: Oct. 24, 2002

(65) Prior Publication Data

US 2004/0154784 A1 Aug. 12, 2004

Related U.S. Application Data

(60) Provisional application No. 60/284,333, filed on Apr. 17, 2001.

(51) Int. Cl.
*B60H 1/00* (2006.01)
*F28D 15/00* (2006.01)

(52) U.S. Cl. .............. 165/41; 165/104.13; 165/104.14; 165/104.17; 165/902

(58) Field of Classification Search .................. 165/41, 165/10, 53, 135, 902, 905, 104.17, 104.11, 165/104.13, 104.14; 126/618

See application file for complete search history.

(56) References Cited

U.S. PATENT DOCUMENTS

| | | | |
|---|---|---|---|
| 3,704,359 A | | 11/1972 | Laing |
| 3,871,684 A | * | 3/1975 | Staudacher et al. ......... 422/165 |
| 4,003,426 A | | 1/1977 | Best et al. |
| 4,178,727 A | | 12/1979 | Prusinski et al. |
| 4,237,023 A | | 12/1980 | Johnson et al. |
| 5,370,814 A | * | 12/1994 | Salyer .......................... 252/70 |
| 5,555,932 A | | 9/1996 | Dudley |
| 5,637,389 A | * | 6/1997 | Colvin et al. ............. 428/308.4 |
| 6,171,647 B1 | * | 1/2001 | Holman ...................... 427/202 |
| 6,291,803 B1 | * | 9/2001 | Fourrey ...................... 219/497 |
| 2002/0166407 A1 | * | 11/2002 | Germuth-Loffler et al. ... 74/552 |

* cited by examiner

*Primary Examiner*—Ljiljana Ciric (57) ABSTRACT

The inventive method includes the utilization of different phase change materials with different melting temperature ranges in each of the headliner (3), the seats (7), and the instrument panel (12) of an automobile in order to save energy while improving thermal comfort for the passengers. When used in the seats (7), the phase change material can be included in the seat heater system. Preferable phase change materials are alkyl hydrocarbons and mixtures thereof, salt-hydrates, metals, alloys, poly-alcohols, and eutectics with phase changes within the desired temperature ranges and with appropriate heat storage capacities. Preferably, the phase change materials are directly incorporated in a polymeric compound structure, in an elastomeric compound structure, or in a foam structure in order to enhance the overall thermal capacity. When used in the seats (7), the phase change material incorporated in a polymeric or elastomeric structure is formed into a mesh-like material (9) and attached to a knitted spacer fabric (6).

15 Claims, 5 Drawing Sheets

FIG. 8

THERMAL CONTROL OF AUTOMOTIVE INTERIORS WITH PHASE CHANGE MATERIAL

CROSS-REFERENCE TO RELATED APPLICATIONS

This application claims priority of U.S. provisional application Ser. No. 60/284,333 filed Apr. 17, 2001 entitled "Air-conditioning of automotive interiors with phase change material". The international application Serial No. PTC/US02/11580 entitled "Thermal control of automotive interiors with phase change material" was filed Apr. 13, 2002 and published Oct. 24, 2002.

BACKGROUND OF THE INVENTION

During the summer months, the temperature inside an automotive passenger compartment can rise substantially; especially, when the car is parked outside and the sun's heat radiation penetrates steadily through the windows. In order to stabilize the interior temperature while driving the car, many car models are equipped with air-conditioning systems. But providing a sufficient cooling capacity requires a high energy expenditure.

On the other side, during the winter months, the driver and the passengers are often confronted with very low temperatures in the passenger compartment at departure. After turning on the heating system, it usually takes a few minutes before a significant temperature increase occurs. In order to solve the problem, some car models have extra heating systems installed in their seats. The energy necessary for running the seat heating system is provided by the car's battery. Due to addition of new auxiliary systems for monitoring and controlling functions in the cars over the past years, the power supply needed for their operation has steadily increased. In order to prevent demands for further increases in the battery's capacity, energy savings are necessary.

Phase change material possesses the ability to change its physical state within a certain temperature range. When the melting temperature of a phase change material in a heating process is obtained, the phase change from the solid state to the liquid state occurs. During this melting process, the phase change material absorbs and stores a large amount of latent heat. The temperature of the phase change material remains nearly constant during the entire process. In a cooling process, the heat stored by the phase change material is released into the environment in a certain temperature range and a reverse phase change from the liquid state to the solid state takes place. During this crystallization process, the temperature of the phase change material also remains constant. The high heat transfer during the melting process and the crystallization process, both without any temperature change, is responsible for the phase change material's appeal as a source of heat storage.

In order to contrast the amount of latent heat absorbed by a phase change material during the actual phase change with the amount of sensible heat absorbed in an ordinary heating process, the ice-water phase change process will be used. When ice melts, it absorbs an amount of latent heat of about 335 J/g. When the water is further heated, it absorbs a sensible heat of only 4 J/g while its temperature rises by one degree C. Therefore, the latent heat absorption during the phase change from ice into water is nearly 100 times higher than the sensible heat absorption during the heating process of water outside the phase change temperature range.

In addition to ice (water), more than 500 natural and synthetic phase change materials are known, including salt hydrates, metals, alloys, poly-alcohols, eutectics and paraffine. These materials differ from one another in their phase change temperature ranges and their heat storage capacities.

In the present applications of the phase change material technology in garments and home furnishing products, paraffine are used exclusively. These are crystalline alkyl hydrocarbons with different chain lengths. Characteristics of suitable paraffine are summarized in Table 1.

TABLE 1

Thermal characteristics of selected paraffine

| Paraffin | Melting temperature, ° C. | Crystallization temperature, ° C. | Latent heat storage capacity, J/g |
|---|---|---|---|
| Heneicosane | 40.5 | 35.9 | 213 |
| Eicosane | 36.1 | 30.6 | 247 |
| Nonadecane | 32.1 | 26.4 | 222 |
| Octadecane | 28.2 | 25.4 | 244 |

Compared to other phase change materials, the paraffine possess very high heat storage capacities. Furthermore, paraffine can be mixed in order to realize desired temperature ranges in which the phase change will take place. Paraffine are nontoxic, noncorrosive and nonhygroscopic. The thermal behavior of the paraffine remains stable also under permanent use. Paraffine are byproducts of petroleum refining and therefore inexpensive. A disadvantage of the paraffine is their low resistance to ignition. But this problem can be solved by adding fire retardants.

In the present applications, the paraffine are microencapsulated. They are applied to a textile matrix by incorporating them into fibers and foams or by coating them onto a textile surface. For example, microencapsulated paraffinic phase change materials have been described as a suitable component for substrate coating when exceptional heat storage capabilities are desired. The U.S. Pat. No. 5,366,801 for "Fabrics with reversible enhanced thermal properties" to Bryant, et al., incorporated herein by reference, teaches that substrates coated with a binder containing microencapsulated phase change material enables a substrate to exhibit extended heat storage properties. Furthermore, microencapsulated phase change materials have been described as a suitable component for inclusion in fibers or foams. U.S. Pat. No. 4,756,958 for "Fiber with reversible enhanced thermal storage properties and fabrics made therefrom" to Bryant et al., incorporated herein by reference, teaches that a fiber with microencapsulated phase change material possesses enhanced thermal storage properties. U.S. Pat. No. 5,637,389 for "Thermally enhanced foam insulation" to Colvin et al., also incorporated herein by reference, reports a thermally enhanced foam insulation where the microcapsules are embedded within the foam.

There are also compound structures with incorporated phase change material available now which might be more appropriate for some automotive interior applications. U.S. Pat. No. 4,908,166 for a "Method for preparing polyolefine containing a phase change material" to Salyer, incorporated herein by reference, teaches that a polyolefine material containing phase change material possesses enhanced thermal storage properties.

There are several thermal effect which can be obtained by a phase change material application in a certain product, such as:

a cooling effect, caused by heat absorption of the phase change material;

a heating effect, caused by heat emission of the phase change material;

a thermo-regulating effect, resulting from either heat absorption or heat emission of the phase change material which keeps the temperature of a surrounding substrate nearly constant.

The efficiency and duration of each of these effects is determined by the heat storage capacity of the phase change material, the phase change temperature range, the structure of the matrix material carrying the phase change material, and the structure of the end-use product.

SUMMARY OF THE INVENTION

The transfer of the phase change material technology into different areas of the automotive interior results in a significant thermal control effect which acts in addition to the thermal control effect of a conventional air-conditioning system the car is equipped with. The thermal control effect provided by the phase change material is initiated by temperature changes and does not need to be induced and maintained by electrical power. This thermal control mechanism leads to major energy savings, because the conventional air-conditioning systems can be downsized substantially and seat heater systems can be operated more efficiently. In addition, the thermal comfort of the automotive interior is improved significantly by the application of the phase change material technology.

The technique of the present invention for thermal control of automotive interior includes the utilization of a first phase change material in the headliner, a second phase change material in the car seats, and a third phase change material in the instrument panel.

The first phase change material might be embedded in a thin polymeric or elastomeric compound structure which is attached to the headliner for the purpose of absorbing excess heat generated in the passenger compartment mainly by heat penetration through the windows.

The second phase change material is located on the back side of the car seat cover and is separated from the seat cover by a spacer fabric or a lofted batting. The structure which contains the phase change material may be a polymeric compound structure, an elastomeric compound structure, or a foam. In one embodiment of the technique of the present invention, the containment structure for the phase change material also includes the seat heater system. The second phase change material shall absorb surplus body heat, if necessary, to enhance the thermal seating comfort. Furthermore, in correspondence with a seat heater system, the phase change material shall prevent overheating and contribute to energy savings by extending the time between the heating cycles.

The third phase change material is embedded in a polymeric compound structure, an elastomeric compound structure or a foam and is located underneath the cover layer of the instrument panel. In the instrument panel application, the phase change material absorbs excess heat generated in the passenger compartment mainly by heat penetration through the wind shield.

In a preferred embodiment of the technique of the present invention, the melting temperature of the first phase change material is in a range between 30° C. and 34° C.; the melting temperature of the second phase change material is in a range between 34° C. and 38° C.; and the melting temperature of the third phase change material is in a range between 38° C. and 43° C.

DETAILED DESCRIPTION OF THE INVENTION

Figure 1:
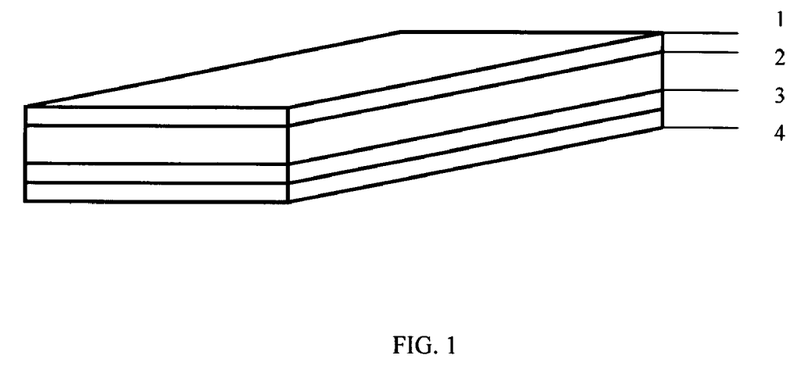
FIG. 1 is a perspective view of a headliner comprising a containment structure with incorporated phase change material useful for providing thermal control in the automotive interior.
Figure 1A:
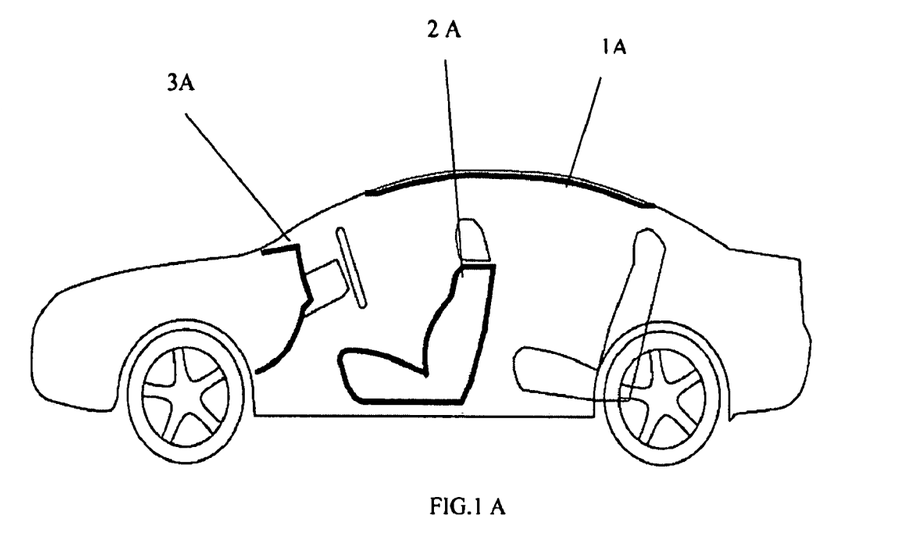
FIG. 1A is a sectional, schematic view of an automotive, where the passenger compartment comprises a headliner, an instrument panel and seats which are equipped with phase change material in order to control the temperature of the passenger compartment.

The applicant has discovered that incorporation of phase change materials in the headliner (1A), the seat (2A), and the instrument panel (3A) of an automotive passenger compartment provides a temperature stabilizing effect in the automotive interior leading to an increase in thermal comfort. The arrangement of the phase change material in the selected components (headliner, seats and instrument panel) of an automotive passenger compartment is shown in FIG. 1A.

In a closed passenger compartment, hot air, which is build up mainly by sunlight exposure through the windows, moves to the top and heats up the headliner. Furthermore, heat may also penetrates through the car's roof during periods of parking leading to an increase in the headliner's temperature.

If phase change material is applied to the headliner, it can absorb this surplus heat without an rise in the headliner's temperature. This leads to a reduction in the temperature gradient between the bottom and the top of the passenger compartment resulting in an overall more comfortable thermal sensation. In addition, the thermal control effect of the phase change material supports a car's air-conditioning system and helps to save energy necessary to run the air-conditioning equipment. The heat stored in the phase change material might be released through the roof into the environment during driving periods of the car or as a result of the overnight cooling.

Preliminary studies were carried out in order to select the appropriate phase change material, the necessary amount of phase change material, and a suitable location for the phase change material in the headliner. The headliner composite used in this studies consists of an outside nonwoven layer (1), an intermediate foam insulation layer (2), and an inside leather layer (4).

For the example headliner configuration the following technical data have been determined:

Weight per unit area: 885 g/m$^2$,

Thickness: 7.54 mm,

Thermal resistance: 0.2583 m$^2$K/W,

Specific heat capacity: 1.372 J/g K.

In the tests, a temperature increase of 30 K over a period of two hours has occurred which indicates that the headliner has absorbed about 54 kJ of heat energy. This leads to a heat absorption of about 27 kJ per hour by the selected headliner during high heat incidences observed in this test. In order to avoid such a temperature increase in the headliner, most of this heat needs to be absorbed by the phase change material.

For the application in the specific headliner of the defined car model, a phase change material was selected which absorbs heat in a temperature range between 30° C. and 34° C. and releases heat in a temperature range between 25° C. and 29° C. By using phase change material in the selected temperature range the temperature of the headliner can be stabilized in a comfortable temperature range around 30° C. The phase change materials absorbing and releasing heat in this preferred temperature range of the present invention include the crystalline alkyl hydrocarbons listed in Table 1 and mixtures thereof. However, salt-hydrates, metals, alloys, poly-alcohols and eutectics with phase changes in the suggested temperature range and appropriate heat storage capacities might also be applied. The melting temperature range of the selected phase change material ensures that the heat absorption starts when the temperature increase exceeds the comfort range. For car models equipped with different headliner constructions, this temperature range may vary slightly.

Most preferably, the phase change material is directly incorporated in a polymeric or elastomeric compound material, which may consist of polyethylene, polyolefin, polyurethane, silicon or polyacrylate. A polyurethane gel compound layer with 40 wt. % of phase change material and a thickness of only 1.5 millimeter possesses a heat storage capacity of about 100 kJ/m$^2$. In reference to the headliner's area of 1.5 m$^2$, about 150 kJ of heat can be absorbed by the phase change material arranged in the headliner. This would be enough to avoid a significant temperature increase in the headliner over a complete day even under warm climatic conditions and significant heat exposures. Textile material such as foam or fabrics with incorporated microencapsulated phase change material may also be used for such a headliner application. However, it needs to be acknowledged that the heat storage capacities of foams or fabrics with microencapsulated phase change material do not exceed 30 kJ/m$^2$ resulting in thermal control effects which are substantially shorter than those received for the polymeric and elastomeric compound structures with incorporated phase change material. In particular, the heat storage capacity of foams or fabrics with microencapsulated phase change material allows a heat absorption effect which lasts for about one to two hours.

Most preferably, the layer of the compound structure with the directly incorporated phase change material (3) is arranged between the inside (fabric or leather) layer (4) facing the passenger compartment and the intermediate (foam) insulation layer (2) of the headliner configuration in order to obtain a sufficient heat absorption arising from the passenger compartment. On the other side, the insulation effect of the intermediate (foam) insulation layer and the outside (nonwoven) layer (1) avoids a substantial absorption of the heat penetrating from outside through the roof. The headliner configuration, equipped with a layer of a compound structure with directly incorporated phase change material (3), is shown in FIG. 1.

Figure 2:
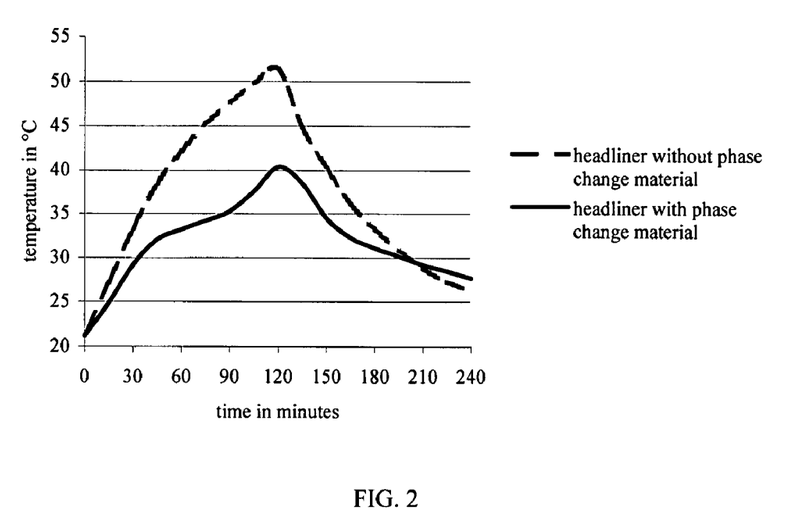
FIG. 2 is a graphical representation of the temperature development in headliners with and without phase change material in a heating-cooling cycle.

Temperature measurements which were carried out for headliner configurations with and without phase change material are shown in FIG. 2. In the measuring process, the headliner was first exposed to a radiant heat source for a two hour period. The radiant heat source was then removed; and the heat absorbed by the headliner configuration during the heating process was released without any external means of cooling. The test results indicate that the heat absorption of the phase change material delays the temperature increase of the headliner substantially. This leads to a significantly lower temperature of the headliner with phase change material at the end of the heating process. At the beginning of the cooling process, a similar temperature decrease has been determined for both headliners. The temperature decrease is delayed by the heat release of the phase change material preventing a fast temperature drop below 28° C. In cases where heat exposures are small and do not last very long, the headliner temperature can be kept in the comfortable temperature range at about 30° C. without any support by external air-conditioning systems.

The thermo-physiological comfort of a car seat is determined by the thermal and moisture management provided by its components. The thermal management can be described in terms of thermal insulation provided by the cushioning components and heat absorption mainly provided by the seat's covering material. The moisture management results from the water vapor transport through the cushioning components and from the water vapor absorption of the seat's covering material. The total heat flux through the seat is determined by a combination of these parameters.

During driving, the human body generates an amount of heat between 150 W and 300 W. This heat must be removed from the human body at the same rate as it is produced in order to keep the body's core temperature constant at approximately 37° C. Part of the generated heat needs to be removed through the seat. However, the dry and wet heat flux through the seat cushion does often not provide the heat exchange necessary under the given circumstances. For instance, under high ambient temperatures the heat flux through the seat is mostly not high enough to remove all the surplus heat which is locked in the microclimate between the body and the seat's covering material. Otherwise, under low ambient temperatures, the heat flux through the seat component is high so that too much heat is removed from the driver's or passenger's body.

Applied to a car seat, phase change material can be used to absorb surplus body heat, if necessary, in a quick and efficient manner. Through heat absorption of the phase change material, the temperature increase in the microclimate can be delayed; and thus, the moisture content in the microclimate can be reduced as well. On the other side, the heat release of the phase change material can delay the heat flux from the body through the seat in order to reduce the body's heat loss providing a warm sensation while sitting in the seat at low ambient temperatures.

A common seat configuration consists of a foam pad and a covering material attached to the foam pad. The covering material is usually a flat woven fabric or a leather material. Sometimes the foam pad is divided into two parts (upper part and lower part) with a heater located between the two parts.

Figure 3:
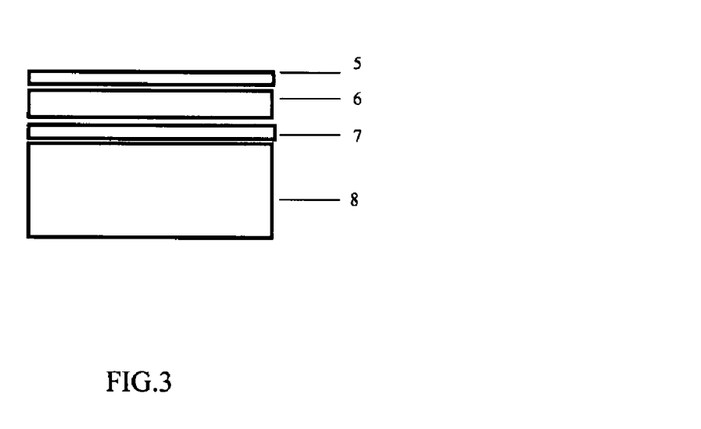
FIG. 3 is a sectional view of a car seat construction comprising a containment structure with incorporated phase change material useful for providing thermal control in the automotive interior and specifically in the car seat.

In order to obtain the necessary thermal control effects by the phase change material application in a car seat, a new seat construction has been made which is shown in FIG. 3. For the new seat configuration, a knitted spacer fabric (6) is either attached to the back side of the cover material or to a containment structure for the phase change material (5). The containment structure of the phase change material (7) is arranged on top of the foam pad (8) and underneath the spacer fabric. The most preferable containment structure for directly incorporating the phase change material is a polymeric or elastomeric compound structure made of polyolefine, polyethylene, polyurethane or silicon, or polyacrylate. The heater can also be incorporated into the polymeric or elastomeric compound structure with phase change material. As long as the phase change material can be applied in a proper quantity to a fabric or a foam providing the necessary latent heat capacity it is also be possible to use a foam or a fabric with microencapsulated phase change material instead of the polymeric or elastomeric compound structure with phase change material.

A knitted spacer fabric possesses a high thermal insulation effect in an uncompressed stage. If it gets compressed by the weight of a seated person, the knitted spacer fabric loses most of its thermal insulation function. Arranging a knitted spacer fabric between the cover material and the phase change material's containment structure the heat transfer from the cover material to the containment structure is reduced substantially. Therefore, the temperature rise in the containment structure is only small and the containment structure's temperature does not reach the temperature range of the latent heat absorption of the phase change material. Thus, the latent heat absorption by the phase change material is prevented, for instance, when the car is parked outside and the sun radiation exposure increases the temperature in the seats cover layer while nobody is sitting in the seat. On the other side, if a person starts sitting in the seat, the knitted spacer fabric is compressed by the person's weight leading to a substantial loss in its thermal insulation effect. Surplus body heat and the heat absorbed by the cover material penetrates instantly through the knitted spacer fabric and is absorbed by the phase change material. As a result the temperature of the cover material and the temperature within the microclimate between the body and the cover layer will drop into a comfortable temperature range and the temperature is kept nearly constant over a certain period of time.

In addition, in a cold environment, the phase change material releases heat and, therefore, reduces the heat flux from the body through the seat configuration leading to an enhancement of the thermal comfort sensation.

In order to select an appropriate PCM and in order to determine its necessary quantity, the wet and dry heat flux through the seat, under different ambient temperatures, needs to be calculated. The calculation of the heat flux through the single seat components and the complete seat configuration requires the knowledge of parameters such as thermal resistance, water vapor permeability, specific heat absorption, and water vapor absorption. Weight, thickness, thermal resistance and water vapor permeability of an example of a seat configuration are summarized in Table 2.

TABLE 2

Weight, thickness, thermal resistance and water vapor permeability of the seat components

| Seat components | Weight per unit area in g/m² | Thickness in mm | Thermal resistance in m²K/W | Water vapor permeability in g/m²h |
|---|---|---|---|---|
| Flat woven fabric | 585 | 2 | 0.0442 | 53.5 |
| Knitted spacer fabric | 530 | 7 | 0.2530 | 65.3 |
| Polymeric compound layer with phase change material and with the heater | 440 | 3 | 0.0610 | 47.5 |
| Foam pad | 3,230 | 28 | 0.3040 | 4.3 |

In order to estimate the initial heat flux into the seat, the heat absorption and water vapor absorption of the covering material and the knitted spacer fabric were determined. The flat woven covering material possesses a specific heat capacity of about 1.1 J/g K, and a water vapor absorption of about 4.3%. The knitted spacer fabric possesses a specific heat capacity of about 1 J/g K, and a water vapor absorption of about 1.2%. While a person is sitting in the seat, the thermal resistance of the knitted spacer fabric is reduced by up to 40%.

Figure 6:
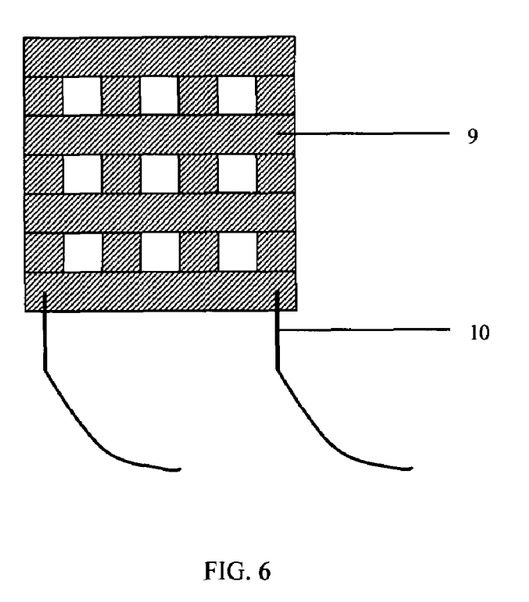
FIG. 6 is a sectional plan view of a seat heater comprising phase change material.

A polymeric or elastomeric compound structure is impermeable for water vapor. In order to realize the water vapor permeability shown in Table 2, the design of the containment structure for the phase change material applied to the seat configuration is shown in FIG. 6. A heating system is preferably integrated into this mesh of the phase change material containment structure.

The phase change material selection is based on the amount of heat generated by an average person, common climatic conditions in the passenger compartment, and the calculated heat flux through the car seat. The preferred phase change material for the seat application absorbs latent heat in a temperature range between 34° C. and 38° C. and releases heat in a temperature range between 29° C. and 33° C. The phase change material applied to the car seat preferably provides a latent heat storage capacity of about 25 kJ to 35 kJ. The containment structure is preferable between 3 and 5 millimeters thick and possesses a effective area of 0.1 to 0.15 m².

Figure 4:
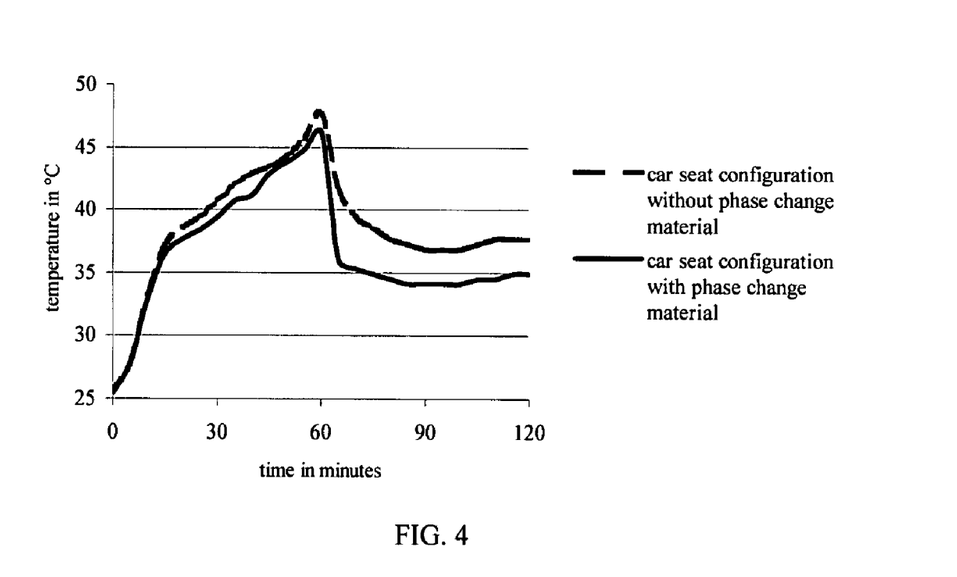
FIG. 4 is a graphical representation of the temperature development on top of the seat cover for seats with and without phase change material before and after seating on a hot summer day.

The phase change materials absorbing and releasing heat in this preferred temperature range of the present invention include the crystalline alkyl hydrocarbons listed in Table 1 and mixtures thereof. However, salt-hydrates, metals, alloys, poly-alcohols and eutectics with phase changes in the suggested temperature range and appropriate heat storage capacities might also be applied. The seat configurations with and without phase change material were tested in seat trials. In the test, the seat was exposed to the radiant heat penetrating though the car's windows over a period of one hour while nobody was sitting in the seat. During this period, the temperature on top of the cover material increased to 48° C. Because of the high thermal resistance of the knitted spacer fabric placed between the seat's cover material and the containment structure which incorporates the phase change material, the temperature of the containment structure and, thus, the phase change material does not rise up to a temperature of 34° C. where the phase change material starts to melt. After a period of one hour, a person began sitting in the seat. There is always an initial temperature decrease because of a heat exchange between the body and the seat. After the initial heat exchange, the temperature in the microclimate between seat cover and body usually rises again if the heat transfer through the seat cushion is not large enough to remove all the excess heat created by the body. The sensible heat absorption of the cushion materials is only small and leads to a steady increase in the material's temperature. However, the phase change material is able to absorb this excess heat without an increase in its temperature. When the person starts sitting in the seat, the knitted spacer fabric between the cover layer and the phase change material containment structure gets compressed and loses a major part of its original thermal resistance allowing for a fast transfer of the heat stored in the previous period of the test by the cover material and the excess heat created by the human body. This heat is absorbed by the phase change material. The duration of the heat absorption effect mainly depends on the heat storage capacity of the phase change material or, in other words, its quantity. Furthermore, the duration of the heat absorption is influenced by the heat transfer characteristics of the containment structure. The selected phase change material in the calculated quantity allows for a long-lasting cooling effect without an external air conditioning. FIG. 4 shows the temperature development on top of the seat cover and in the microclimate between seat and body obtained during the described test.

The test results clearly indicate that there is a substantial delay in the temperature increase within the microclimate, which lasts throughout the one-hour sitting period later in the test. The heat stored in the phase change material is released, for instance, over night at lower temperatures.

Figure 5:
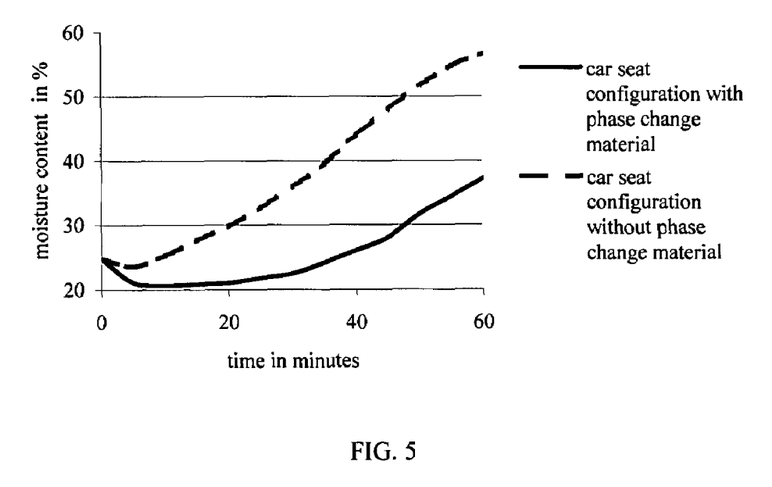
FIG. 5 is a graphical representation of the moisture development on top of the seat cover for seats with and without phase change material while sitting in such a seat on a hot summer day.

The cooling effect of the phase change material also leads to a lower moisture build-up in the microclimate. Test results are shown in FIG. 5. After an initial moisture reduction in the microclimate, resulting from the moisture exchange with the covering material, the moisture content is stabilized on a comparatively lower level over about 30 minutes and then only slightly increased. After a testing time of one hour, the moisture content in the microclimate of a seat with phase change material is only 50% of those moisture content which has been received for a seat without phase change material.

Beside the comfort improvement of the car seat, the phase change material is used to enhance the efficiency of a seat heating system. In preferred seat heater systems, the heating elements are directly integrated in the containment structure which also comprises the phase change material. A preferable containment structure is made of a polymeric or elastomeric compound material consisting of polyolefine, polyethylene, polyurethane, silicone or polyacrylate. The seat heater system covers, for instance, an area of 0.1 m² to 0.15 m² and is about 3 mm thick. A preferred design of the seat heater system is shown in FIG. 6. This design allows a sufficient water vapor transfer through the seat which is necessary for keeping the overall seating comfort.

Figure 7:
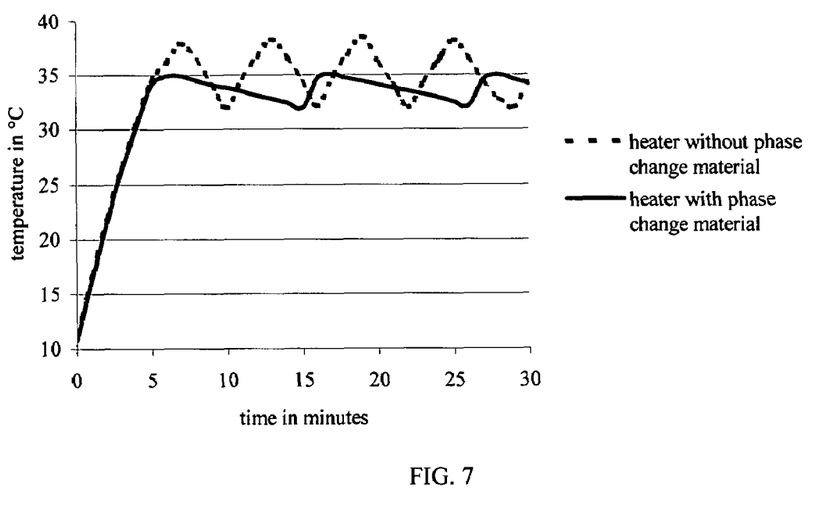
FIG. 7 is a graphical representation of the temperature development received for seat heaters with and without phase change material during a heating process.

The selected phase change material absorbs heat in a temperature range between about 34° C. and 38° C. Its latent heat storage capacity totals about 25 kJ to 35 kJ. The selected phase change material absorbs only heat generated by the heater at the end of the heating period when the material temperature exceeds 34° C. Thus, the initial heating process is not delayed by the heat absorption of the phase change material. After a continuous operation over a time period of five minutes, the additional heating process takes place in form of heating cycles. After the initial heating period, the heater is switched of. There is always an afterheating period where the temperature of the heater system continue to rise. For a seat heater system without phase change material, a temperature increase of 3.4° C. was observed in the after-heating process. However, by heat absorption of the phase change material, this undesired temperature increase after the initial heating period is completed can be avoided, and the system can be protected from overheating. For a heater system with phase change material, the temperature increase in the after-heating period does not exceed 0.8° C. After that initial further temperature rise, the temperature of the heater system decreases continuously. If the temperature of the heater drops below 34° C. during these cycles, the heat stored by the phase change material, is released. As a result, the heater can operate more efficiently then common seat heating systems and the operation time of the heater can be reduced, which saves energy. For instance, the delay time between two switches of the heater system has been doubled by the application of the phase change material leading to a substantial energy saving. Test results, received in tests of seat heater systems with and without phase change material are shown in FIG. 7.

The instrument panel is mainly exposed to the radiant heat which penetrates through the car's wind shield. Because of the high heat exposure by the sun's radiation, also under low ambient temperatures, the instrument panel absorbs a lot of heat and its temperature rises substantially over the day during driving and parking the car outside.

If phase change material is applied to the instrument panel, it can absorb this surplus heat without a rise in the instrument panel's temperature. This can enhance the overall thermal comfort sensation in the car's passenger compartment. In addition, the thermal control effect of the phase change material can prevent overheating in the instrument area and, therefore, delay the thermal aging of the instrument panel components. Thermoplastics undergo dimensional changes in the event of high temperature fluctuations. Minimizing these temperature changes by using the thermal control mechanism of phase change material, a premature brittleness and cracks of the instrument panel's cover material can be prevented. The heat stored in the phase change material located in the instrument panel might be released straight through the wind shield into the environment overnight.

Figure 8:
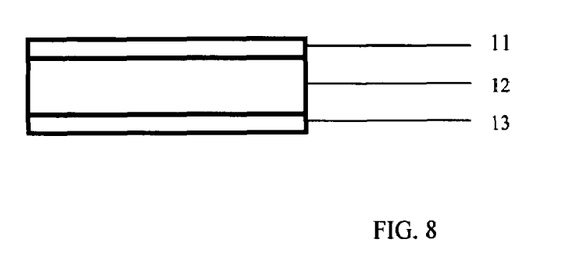
FIG. 8 is a sectional view of a instrument panel comprising a containment structure with incorporated phase change material useful for providing thermal control in the automotive interior.

Preliminary studies were carried out in order to select the appropriate phase change material, the necessary amount of phase change material, and a suitable location for the phase change material in the instrument panel. The instrument panel's composite used in this studies consists of an PVC cover layer (11) and an intermediate polyurethane foam insulation layer (12) bonded to a thermoplastic carrier layer (13).

The PVC cover layer of the instrument panel example possesses a weight of about 1,350 g/m², a thickness of about 1.4 mm and a specific heat capacity of about 0.96 J/g K. The polyurethane foam insulation weights about 1,500 g/m² and is about 8.5 mm thick. The foam possesses a specific heat capacity of about 1.16 J/g K.

In the tests, a temperature increase of about 40 K over a period of two hours occurred on the location between PVC cover layer and polyurethane foam layer which indicates that the instrument panel cover absorbed about 120 kJ of heat energy. This leads to a heat absorption of about 60 kJ per hour by the selected instrument panel cover during high heat incidences observed in this test. In order to avoid such a temperature increase in the instrument panel, most of this heat needs to be absorbed by the phase change material.

For the application in the specific instrument panel of the defined car model, a phase change material was selected which absorbs heat in a temperature range between 38° C. and 43° C. and releases heat in a temperature range between 33° C. and 37° C. By using phase change material in the selected temperature range the temperature of the instrument panel can be stabilized in an acceptable temperature range mainly between 38° C. and 40° C. The heat release at about 37° C. ensures a sufficient temperature gradient between the instrument panel's temperature and the ambient temperature during an overnight heat release through the wind shield. The phase change materials absorbing and releasing heat in this preferred temperature range of the present invention include the crystalline alkyl hydrocarbons listed in Table 1 and mixtures thereof. However, salt-hydrates, metals, alloys, poly-alcohols and eutectics with phase changes in the suggested temperature range and appropriate heat storage capacities might also applied. Most preferably, the phase change material is incorporated in a polymer or elastomeric compound material, which may consist of polyethylene, polyolefin, polyurethane, silicon or polyacrylate. A polyurethane gel compound layer with 40 wt. % of phase change material and a thickness of 8.5 mm possesses a heat storage capacity of about 600 kJ/m². In reference to the instrument panel's area of about 0.7 m², approximately 420 kJ of heat can be absorbed by the phase change material arranged in the instrument panel. This would be enough to avoid a significant temperature increase in the instrument panel over a complete day even under warm climatic conditions and significant heat exposure.

Most preferably, the layer of the polymeric compound material with the incorporated phase change material is arranged directly underneath the PVC cover layer (11) and replaces the intermediate polyurethane foam layer (12) of the instrument panel.

What is claimed is:

1. A thermal control method for automotive interiors comprising: providing an automotive interior including at least a headliner, seats, and an instrument panel; incorporating a first phase change material in the headliner; incorporating a second phase change material in the seats; incorporating a third phase change material in the instrument panel; and using the phase change materials to control the temperature within the automotive interior, wherein the first, second and third phase change materials are homogeneously dispersed within a polymeric, elastomeric, or foam compound.

2. The thermal control method according to claim 1, wherein the first phase change material melts in a temperature range between 30° C. and 34° C., the second phase change material melts in a temperature range between 34° C. and 38° C., and the third phase change material melts in the temperature range between 38° C. and 43° C.

3. The thermal control method according to claim 1, wherein at least one of the first, the second and the third phase change materials are selected from the group consisting of alkyl hydrocarbons, salt-hydrates, metals, alloys, poly-alcohols, and eutectics.

4. The thermal control method according to claim 1, wherein at least one of the first, the second and the third phase change materials are incorporated within a polymeric compound which is coated onto the surface of a fabric or a foam.

5. The thermal control method according to claim 1, wherein at least one of the first, the second and the third phase change materials are incorporated within a polymeric compound which is laminated to a fabric or a foam.

6. The thermal control method according to claim 1, wherein at least one of the first, the second and the third phase change materials are incorporated within an elastomeric compound which is coated onto the surface of a fabric or a foam.

7. The thermal control method according to claim 1, wherein at least on of the first, the second and the third phase change materials are incorporated within an elastomeric compound which is laminated to a fabric or a foam.

8. The thermal control method according to claim 1, wherein the first phase change material is arranged in the headliner between an inside layer of the headliner facing a passenger compartment and an intermediate insulation layer adjacent to an outside layer of the headliner.

9. The thermal control method according to claim 1, wherein the first phase change material is arranged underneath a cover layer of the instrument panel and replaces an intermediate foam layer of the instrument panel and is bonded to a carrier layer located at the bottom of the instrument panel.

10. The thermal control method according to claim 1, wherein the second phase change material is bonded to a spacer fabric.

11. The thermal control method according to claim 1, wherein the second phase change material is bonded to a spacer fabric and arranged on top of a foam pad and below a spacer fabric which is positioned below a cover material in a car seat configuration.

12. The thermal control method according to claim 1, wherein the second phase change material is positioned adjacent to a foam pad and a spacer fabric is positioned adjacent to a cover material in a car seat configuration.

13. The thermal control method according to claim 1, wherein the second phase change material is provided within a containment structure which also includes a seat heater system.

14. The thermal control method according to claim 1, wherein the second a phase change material is bonded to a spacer fabric and wherein the seats include a heating system.

15. The thermal control method according to claim 1, wherein the second phase change material has a containment structure which is in mesh form and in which a heating system is integrated.

* * * * *